(12) United States Patent
Narita et al.

(10) Patent No.: US 12,209,033 B2
(45) Date of Patent: Jan. 28, 2025

(54) FLOW CHANNEL SWITCHING SYSTEM AND WATER CLEANING SYSTEM

(71) Applicant: Toray Industries, Inc., Tokyo (JP)

(72) Inventors: Takashi Narita, Otsu (JP); Toyohiko Mori, Tokyo (JP); Takashi Isobe, Otsu (JP); Kimihiko Sugishima, Yamagata (JP); Yasuhiro Sato, Aichi (JP); Hirohisa Maeda, Aichi (JP)

(73) Assignee: Toray Industries, Inc., Tokyo (JP)

( * ) Notice: Subject to any disclaimer, the term of this patent is extended or adjusted under 35 U.S.C. 154(b) by 385 days.

(21) Appl. No.: 17/775,033

(22) PCT Filed: Nov. 4, 2020

(86) PCT No.: PCT/JP2020/041264
§ 371 (c)(1),
(2) Date: May 6, 2022

(87) PCT Pub. No.: WO2021/095614
PCT Pub. Date: May 20, 2021

(65) Prior Publication Data
US 2022/0396501 A1 Dec. 15, 2022

(30) Foreign Application Priority Data
Nov. 11, 2019 (JP) .................. 2019-203685

(51) Int. Cl.
*C02F 1/00* (2023.01)
(52) U.S. Cl.
CPC ........ *C02F 1/008* (2013.01); *C02F 2201/005* (2013.01); *C02F 2201/009* (2013.01);
(Continued)

(58) Field of Classification Search
CPC ............ C02F 2307/06; C02F 2201/005; C02F 2201/009; C02F 2209/40; C02F 2209/44; C02F 2209/445; E03C 2201/40
(Continued)

(56) References Cited

FOREIGN PATENT DOCUMENTS

| CN | 102548905 A | 7/2012 |
|---|---|---|
| CN | 209173746 U | 7/2019 |

(Continued)

OTHER PUBLICATIONS

Chinese Office Action for Chinese Application No. 202080078250.0, dated Dec. 1, 2023 with translation, 10 pages.
(Continued)

*Primary Examiner* — Claire A Norris
(74) *Attorney, Agent, or Firm* — Buchanan Ingersoll & Rooney PC

(57) ABSTRACT

A flow channel switching system (1, 1') including: a first on-off valve (10) which is disposed between a merging portion (6) and a branching portion (5) and in a raw water path (4); a second on-off valve (11) which is disposed in an outward path for raw water (7); and a sensor (13) that measures a state of water flowing through the raw water path, in which control is performed so as to open the second on-off valve and close the first on-off valve if a signal indicating that water is flowing in the raw water path is received from the sensor, then a signal indicating that no water is flowing in the raw water path is received, and then, within a predetermined time period, a signal indicating that water is flowing again in the raw water path is received.

7 Claims, 12 Drawing Sheets

(52) U.S. Cl.
CPC ...... *C02F 2209/40* (2013.01); *C02F 2307/06* (2013.01); *E03C 2201/40* (2013.01)

(58) Field of Classification Search
USPC .......................................... 210/138, 449, 87
See application file for complete search history.

(56) References Cited

FOREIGN PATENT DOCUMENTS

| JP | 5346762 | A | 4/1978 |
| JP | 07171559 | A | 7/1995 |
| JP | 3027934 | U | 8/1996 |
| JP | 3031868 | U | 12/1996 |
| JP | 10043746 | A | 2/1998 |
| JP | 2001225062 | A | 8/2001 |
| JP | 2003062559 | A | 3/2003 |
| JP | 2004311370 | A | 11/2004 |
| JP | 2006281164 | A | 10/2006 |
| JP | 2009259489 | A | 11/2009 |
| JP | 2016142342 | A | 8/2016 |
| JP | 2018005478 | A | 1/2018 |
| JP | 2019019650 | A | 2/2019 |

OTHER PUBLICATIONS

Vietnamese Examination Report issued Jun. 24, 2024, by the Intellectual Property Office of Vietnam in corresponding Vietnamese Application No. 1-2022-02793 with an English translation. (3 pages).

International Search Report and Written Opinion for International Application No. PCT/JP2020/041264, dated Dec. 15, 2020, 6 pages.

Chinese Office Action for Chinese Application No. 202080078250.0, dated Jun. 14, 2023 with translation, 16 pages.

Office Action (Notice of Reasons for Refusal) issued Oct. 22, 2024, by the Japanese Patent Office in corresponding Japanese Patent Application No. 2020-564772 with an English translation. (5 pages).

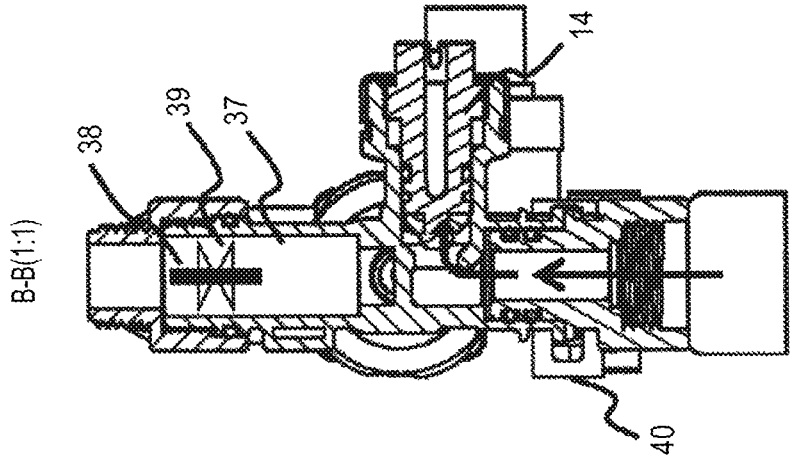
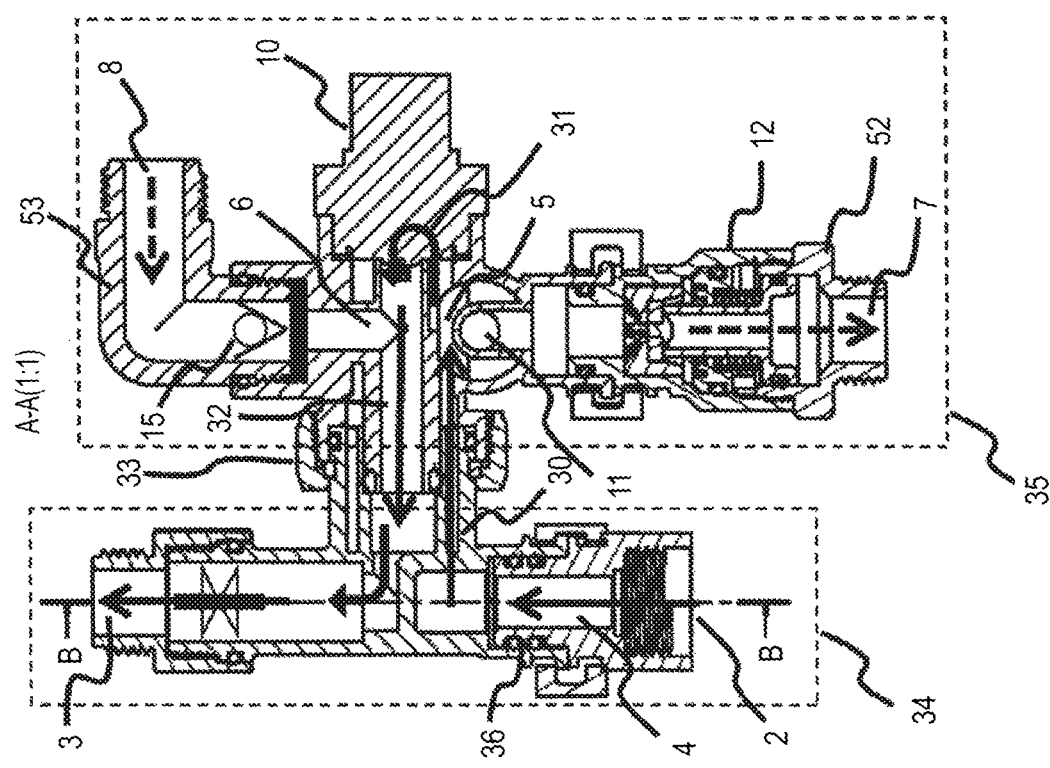
FIG. 3B
FIG. 3A

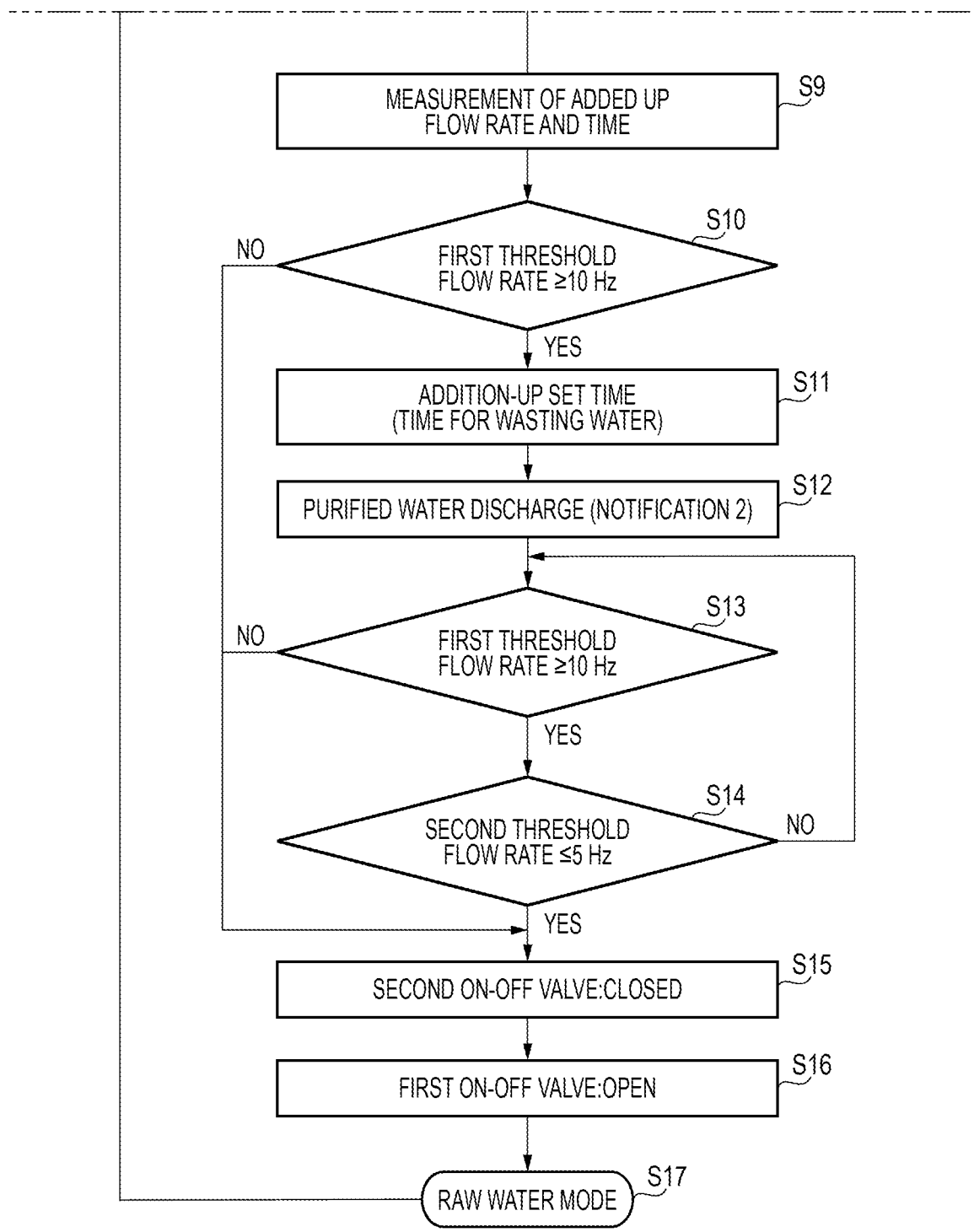

FLOW CHANNEL SWITCHING SYSTEM AND WATER CLEANING SYSTEM

CROSS REFERENCE TO RELATED APPLICATIONS

This application is the U.S. National Phase application of PCT/JP2020/041264, filed Nov. 4, 2020 which claims priority to Japanese Patent Application No. 2019-203685, filed Nov. 11, 2019, the disclosures of these applications being incorporated herein by reference in their entireties for all purposes.

FIELD OF THE INVENTION

The present invention relates to a water purifying system that uses tap water as raw water to supply purified water as drinking water for general household use or business use, and a flow channel switching system that is used in the water purifying system.

BACKGROUND OF THE INVENTION

Faucet direct connection type water purifier directly connected to a discharge port of a tap water faucet, stationary type water purifier placed and used on a kitchen, and under-sink type water purifier placed and used under a kitchen sink have been heretofore known as water purifiers for purifying tap water. In any of these types of water purifiers, a total amount of filtered water that a filter medium filled in a filter cartridge for the water purifier can process is limited. Therefore, the water purifier has a switching function between a raw water discharge state and a purified water discharge state. A user can switch the state of the water purifier to the purified water discharge state only when the user wants to get purified water. In this manner, the life of the filter cartridge for the water purifier can be extended. When the filtered water reaches the total amount the filter medium can process, the user replaces the filter cartridge for the water purifier.

In the case of the under-sink type water purifier, a special hot water/water mixing composite faucet for the water purifier as in PTL 1 is often used as a means for switching between the raw water discharge state and the purified water discharge state. Alternatively, a single faucet for the water purifier may be disposed separately from a main faucet so that the two faucets, i.e. the faucet for use of raw water and the faucet for use of purified water, can be used appropriately.

On the other hand, water purifying systems that do not use faucets for water purifiers have also been proposed. For example, PTL 2 discloses an under-sink type water purifying device including: a raw water path that is formed by a water pipe; a purified water path that is attached to the water pipe; and a solenoid valve that makes switching to send water to either of the raw water path and the purified water path, in which an operating portion that has a touch panel is operated to control the solenoid valve.

In addition, PTL 3 and PTL 4 disclose hot water/water mixing faucets each having a configuration in which an under-sink type water purifier is connected to an existing faucet. Specifically, in the hot water/water mixing faucet according to PTL 3, a check valve, a T-type pipe joint, and an electric three-way valve are disposed between a lower end portion of a water introduction pipe of a faucet body and a water shutoff valve that opens/closes a raw water flow channel to the water introduction pipe. An outlet portion for purified water in the water purifier is connected to the T-type pipe joint through the check valve, and an inlet portion for raw water in the water purifier is connected to the electric three-way valve. Also in the hot water/water mixing faucet disclosed in PTL 4, a branching flow channel is disposed in a raw water flow channel and a purified water path is disposed in the branching flow channel.

PATENT LITERATURE

PTL 1: JP-A-2016-142342
PTL 2: JP-A-2001-225062
PTL 3: Japanese Utility Model Registration No. 3027934
PTL 4: JP-A-H07-171559

SUMMARY OF THE INVENTION

However, to newly install an under-sink type water purifier under a kitchen sink, an existing hot water/water mixing faucet must be removed and an expensive special hot water/water mixing composite faucet for the water purifier must be purchased. Therefore, great expense is required. In addition, there are only a few types of hot water/water mixing composite faucets available for the water purifier. Therefore, due to the limited faucet options, a user who is particular about design cannot select a faucet with a design the user likes.

On the other hand, the under-sink type water purifying device disclosed in PTL 2 can use an existing hot water/water mixing faucet. Therefore, when a user who is particular about design chooses a faucet, the user can select a faucet the user likes from options that include not only hot water/water mixing composite faucets for water purifiers but also hot water/water mixing faucets not for water purifiers.

However, construction work for installing, above the sink, a touch panel or a push button for performing a switching operation between raw water and purified water, or for drilling a hole in the sink to route wiring under the sink is necessary, thereby requiring expense and time. Further, in order to allow the purified water to be discharged, an operation on the touch panel or the push button in addition to an operation on the lever is necessary. Such a plurality of operations are troublesome. Furthermore, in a case where a drawer is set under the sink, there is a concern that the wiring from above the sink to under the sink may get caught in the drawer. Furthermore, the wiring may interfere with installation of a filter cartridge for the water purifier.

In view of the aforementioned problem, the present invention provides a water purifying system that does not require purchase of an expensive special hot water/water mixing composite faucet for water purifier, that does not require construction work for installing a touch panel or a push button or for routing wiring, and that can be operated simply and used easily, and a flow channel switching system for realizing the water purifying system.

In addition, the hot water/water mixing faucet according to PTL 3 or PTL 4 requires a worker to connect the check valve, the T-type pipe joint, the electric three-way valve etc. in sequence at the site. It takes a great deal of time for the connection work. Therefore, an improvement in the connection workability is desired. Further, in recent years, there is also a growing customer demand for securing a space around the sink, and it is also necessary to attain space-saving.

In view of the aforementioned problem, the present invention provides a flow channel switching system that can improve connection workability and save space with attention paid to integration of flow channel switching components that are arranged in a raw water flow channel for supplying water from a master valve for tap water to a faucet.

[1] The aforementioned flow channel switching system according to the present invention, which solves the first problem, is a flow channel switching system used in a water purifying system, the flow channel switching system including:

a raw water path that has an inflow port and an outflow port;

an outward path for raw water and a return path for purified water that are connected to a water purifier;

a branching portion that is disposed in the raw water path to split, into the outward path for raw water, a raw water that has flown through the raw water path from the inflow port;

a merging portion that is disposed between the branching portion and the outflow port in the raw water path to merge, into the raw water path, a purified water that has been purified by the water purifier and has flown through the return path for purified water;

a first on-off valve that is disposed between the branching portion and the merging portion in the raw water path;

a second on-off valve that is disposed in the outward path for raw water;

a sensor that is disposed between the inflow port and the branching portion or between the merging portion and the outflow port in the raw water path, and that measures a state of water flowing through the raw water path; and a control portion that controls the first on-off valve and the second on-off valve based on a signal from the sensor, in which the control portion performs control of opening the second on-off valve and closing the first on-off valve when receiving, from the sensor, a signal indicating a state that water is flowing in the raw water path, then receiving a signal indicating a state that water is not flowing in the raw water path, and then receiving a signal indicating a state that water is flowing in the raw water path again within a predetermined time period.

[2] In the flow channel switching system according to the aforementioned [1], preferably, the sensor is a flow sensor that sends out a pulse signal with a frequency corresponding to a flow rate of water flowing through the raw water path, the signal indicating the state that water is flowing in the raw water path is a pulse signal with a frequency equal to or higher than a first threshold, and the signal indicating the state that water is not flowing in the raw water path is a pulse signal with a frequency equal to or lower than a second threshold.

[3] In the flow channel switching system according to aforementioned [2], preferably, the first threshold is set at a frequency corresponding to a flow rate in a range of equal to or higher than 1 L/min and equal to or lower than 2 L/min, and the second threshold is set at a frequency corresponding to a flow rate in a range of equal to or higher than 0.5 L/min and lower than 1 L/min.

[4] Preferably, the flow channel switching system according to the aforementioned [2] or [3] further includes: a notification portion that emits sound, light, and/or vibration, in which the control portion adds up a usage amount based on a pulse signal from the flow sensor during an open state of the second on-off valve, and sends out, to the notification portion, a signal for urging replacement of the water purifier when the added-up amount is equal to or larger than a water purifier replacement threshold, and in which upon reception of the signal for urging replacement of the water purifier from the control portion, the notification portion emits the sound, light, and/or vibration for urging replacement of the water purifier.

[5] Preferably, the flow channel switching system according to any of the aforementioned [2] to [4] further includes: a notification portion that emits sound, light, and/or vibration, in which the control portion adds up a usage amount based on a pulse signal from the flow sensor from when the first on-off valve is closed to when the second on-off valve is open next time, and sends out, to the notification portion, a signal for urging usage of the water purifier when the added-up amount is equal to or larger than a waste water threshold, and in which upon reception of the signal for urging usage of the water purifier from the control portion, the notification portion emits the sound, light, and/or vibration for urging usage of the water purifier.

[6] Preferably, the flow channel switching system according to any of the aforementioned [2] to [5] further includes: a notification portion that emits sound, light, and/or vibration, in which the control portion includes a battery, and sends out, to the notification portion, a signal for urging replacement of the battery when a voltage of the battery is equal to or higher than a battery life threshold, and in which upon reception of the signal for urging replacement of the battery from the control portion, the notification portion emits the sound, light, and/or vibration for urging replacement of the battery.

[7] The aforementioned water purifying system according to the present invention, that solves the first problem, includes:

the flow channel switching system according to any one of the aforementioned [1] through [6]; and a water purifier having a raw water inlet and a purified water outlet, in which the outward path for raw water and the return path for purified water in the flow channel switching system are respectively connected to the raw water inlet and the purified water outlet in the water purifier.

[8] The aforementioned flow channel switching system according to the present invention, which solves the second problem, is a flow channel switching system used in a water purifying system, the flow channel switching system including:

a raw water path that has an inflow port, an outflow port, a branching portion, and a merging portion; and an outward path for raw water and a return path for purified water that are connected to a water purifier, in which the branching portion is a portion that splits, into the outward path for raw water, a raw water that has flown through the raw water path from the inflow port, in which the merging portion is a portion that is disposed between the branching portion and the outflow port in the raw water path to merge, into the raw water path, a purified water that has been purified by the water purifier and has flown through the return path for purified water, the flow channel switching system further including:

a first on-off valve that is disposed between the branching portion and the merging portion in the raw water path; and a second on-off valve that is disposed in the outward path for raw water, in which the raw water path, the outward path for raw water, the return path for purified water, the first on-off valve and the second on-off valve are connected to be integrated without through any other piping.

[9] In the flow channel switching system according to the aforementioned [8], preferably, the raw water path has a structure in which the raw water path can be divided at a coupling portion, the flow channel switching system is constituted by a first flow channel switching unit including a portion of the raw water path having the inflow port and the outflow port, and a second flow channel switching unit including a portion of the raw water path having the branching portion and the merging portion, and the first flow channel switching unit and the second flow channel switching unit are coupled at the coupling portion so as to be integrated.

[10] The aforementioned flow channel switching system according to the present invention, that solves the second problem, is preferably a flow channel switching system used in a water purifying system, the flow channel switching system including:

a raw water path that has an inflow port, an outflow port, and a merging portion;

an outward path for raw water and a return path for purified water that are connected to a water purifier; and a three-way valve that is disposed in the raw water path to split, into the outward path for raw water, a raw water that has flown through the raw water path from the inflow port, in which the merging portion is a portion that is disposed between the three-way valve and the outflow port in the raw water path to merge, into the raw water path, a purified water that has been purified by the water purifier and has flown through the return path for purified water, and in which the raw water path, the outward path for raw water, the return path for purified water and the three-way valve are connected to be integrated without through any other piping.

[11] In the flow channel switching system according to the aforementioned [10], preferably, the raw water path has a structure in which the raw water path can be divided at a coupling portion, the flow channel switching system is constituted by a first flow channel switching unit including a portion of the raw water path having the inflow port and the outflow port, and a second flow channel switching unit including a portion of the raw water path having the three-way valve and the merging portion, and the first flow channel switching unit and the second flow channel switching unit are coupled at the coupling portion so as to be integrated.

[12] In the flow channel switching system according to any of the aforementioned [8] to [11], preferably, the raw water path, the outward path for raw water, and the return path for purified water are molded out of a hard resin material.

[13] In the flow channel switching system according to any of the aforementioned [8] to [12], preferably, the raw water path has a straight pipe outward path that is disposed after the raw water path is bent substantially by 90 degrees downstream of the inflow port, a U-turn path that follows the straight pipe outward path, and a straight pipe return path that follows the U-turn path; and the straight pipe outward path and the straight pipe return path form a substantially coaxial double pipe.

[14] In the flow channel switching system according to any of the aforementioned [8] to [13], preferably, the inflow port and the outflow port are in such a positional relation that their respective central axes are two parallel axes.

[15] In the flow channel switching system according to any of the aforementioned [8] to [14], preferably, the outflow port and the return path for purified water are in such a positional relation that their respective central axes are the same axes.

According to the flow channel switching system according to the present invention, which solves the first problem, and the water purifying system which uses this flow channel switching system, even in a case of newly installing an under-sink type water purifier under a kitchen sink, the under-sink type water purifier can be attached to an existing hot water/water mixing faucet so that it is unnecessary to purchase an expensive hot water/water mixing composite faucet for the water purifier. Therefore, great expense is not required. Owing to a wide range of faucet options, a user who is particular about design can select a faucet with a design the user likes.

In addition, a state of water flowing through the raw water path is measured by the sensor and the on-off valves are controlled by operations on a lever of the existing hot water/water mixing faucet. Accordingly, it is unnecessary to install, above the sink, a touch panel or a push button for making a switching operation between raw water and purified water. For example, the switching between the raw water and the purified water can be performed by only operations on the lever of the faucet. Accordingly, no troublesome operation with a plurality of operations is necessary. Furthermore, there is no need for construction work for drilling a hole in the sink to route wiring under the sink. Therefore, expense and time are not required.

Moreover, even in a case where a drawer is set under the sink, there is no concern that the wiring from above the sink to under the sink may get caught in the drawer. Furthermore, the wiring also never interferes with installation of a filter cartridge for the water purifier.

According to the switching system according to the present invention, which solves the second problem, workability of connection of the switching system to a faucet body can be improved. At the same time, the switching system can be also connected to an existing faucet body, and space-saving can be attained.

BRIEF DESCRIPTION OF DRAWINGS

FIG. 3A and FIG. 3B are longitudinal sectional views of the flow channel switching system in FIG. 2. FIG. 3A is a sectional view taken along a line A-A of FIG. 2 and FIG. 3B is a sectional view taken along a line B-B of FIG. 3A.

DETAILED DESCRIPTION OF EMBODIMENTS OF THE INVENTION

An embodiment of a flow channel switching system in the present invention will be described based on the drawings.

Figure 1:
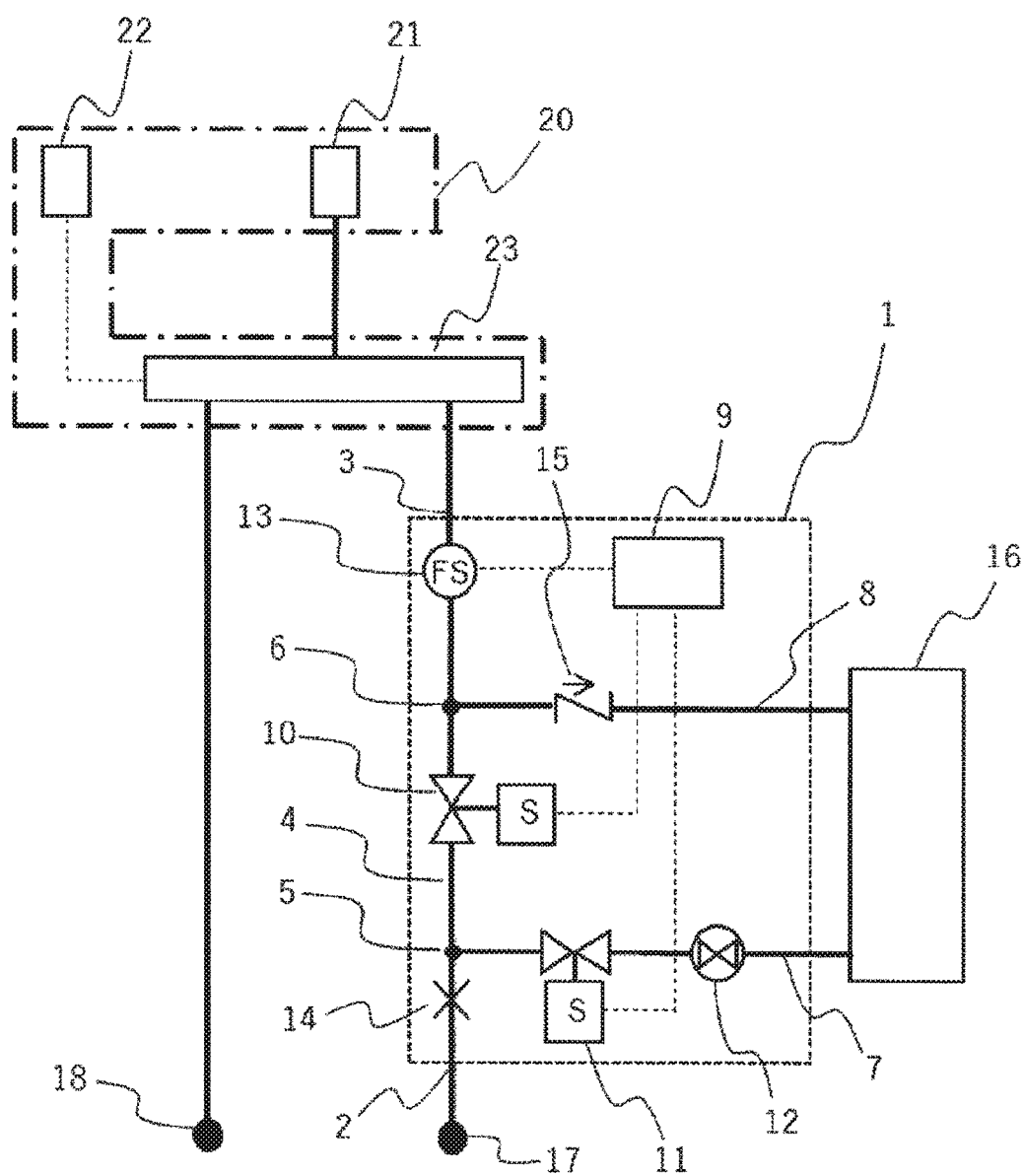
FIG. 1 is a flow channel configuration diagram showing an example of connection between a flow channel switching system according to an embodiment of the present invention and a water purifier, a faucet, a water supply source, and a hot water supply source.

FIG. 1 is a flow channel configuration diagram showing an example of connection between a water purifying system formed by combining a flow channel switching system 1 in the present invention with a water purifier 16, and a hot water/water mixing faucet 20, a water supply source 17 and a hot water supply source 18. The flow channel switching system 1 is provided with a raw water path 4 that connects an inflow port 2 and an outflow port 3 to each other. The raw water path 4 is provided with a branching portion 5 that splits, into an outward path for raw water 7, raw water that has flown from the inflow port 2. A merging portion 6 at which a return path for purified water 8 merges is disposed between the branching portion 5 and the outflow port 3. A first on-off valve 10 that opens/closes the flow channel based on control of a control portion 9 is disposed between the branching portion 5 and the merging portion 6. The outward path for raw water 7 is provided with a second on-off valve 11 that opens/closes based on control of the control portion 9, and a pressure regulating valve 12 that is configured to prevent water pressure inside piping from rising above predetermined pressure. As the pressure regulating valve 12, a pressure regulating valve that sets and fixes the pressure, for example, to 0.2 MPa or 0.1 MPa may be used, or a pressure regulating valve that can set the pressure desirably may be used.

Figure 2:
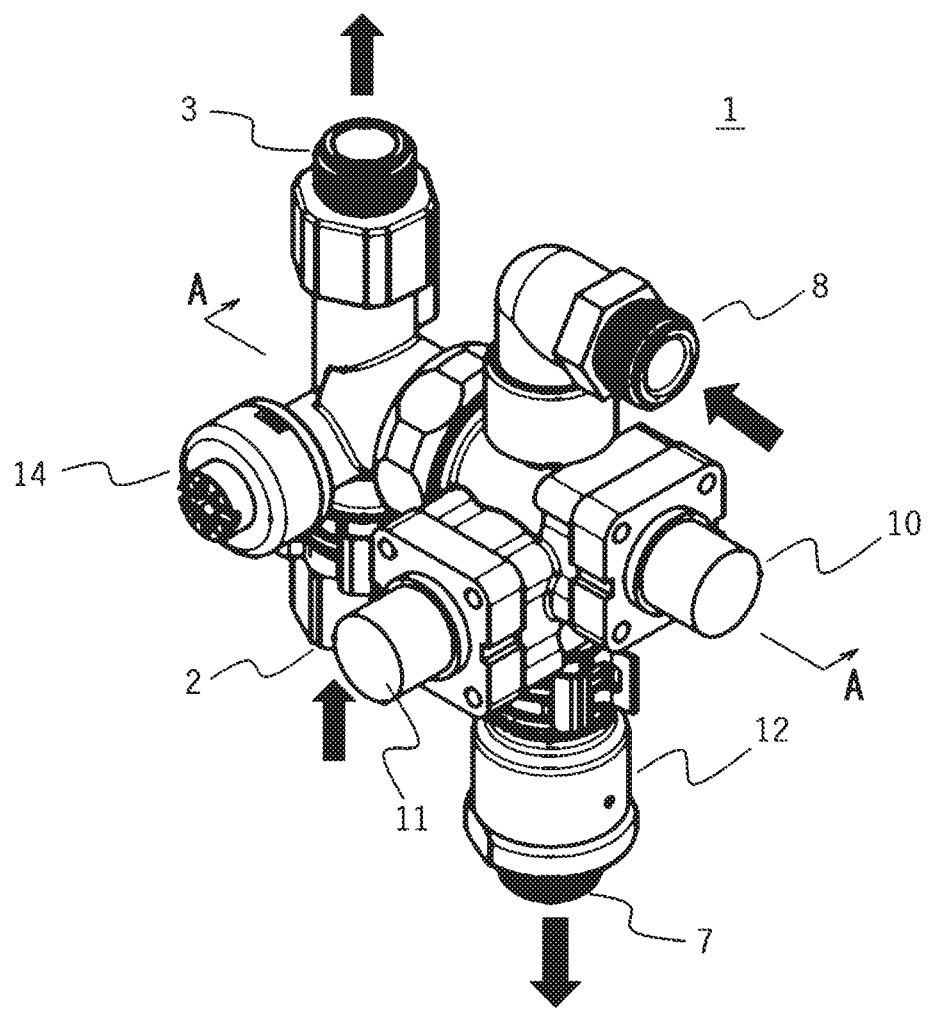
FIG. 2 is a perspective view of the flow channel switching system according to the embodiment of the present invention.

FIG. 2 is a perspective view of an embodiment of the flow channel switching system 1 in the present invention. FIG. 3A and FIG. 3B are longitudinal sectional views, in which FIG. 3A is a sectional view taken along a line A-A of FIG. 2, and FIG. 3B is a sectional view taken along a line B-B of FIG. 3A. The raw water path 4 communicating with the inflow port 2 and the outflow port 3 is bent substantially by 90 degrees downstream of the inflow port, then passes through a straight pipe outward path 30, a U-turn path 31, and a straight pipe return path 32 after the U-turn, and is then bent substantially by 90 degrees to reach the outflow port 3. The outward path for raw water 7 branches downward from the branching portion 5 of the straight pipe outward path 30. Immediately after the branching, the second on-off valve 11 and the pressure regulating valve 12 following the second on-off valve 11 are disposed. The return path for purified water 8 merges with the straight pipe return path 32 at the merging portion 6 from above. The first on-off valve 10 is disposed in the U-turn path 31 downstream from the branching portion 5, and a driving portion for the first on-off valve 10 is arranged outside the straight pipe outward path 30 and the straight pipe return path 32. With the aforementioned arrangement, a distance between the straight pipe outward path 30 and the straight pipe return path 32 can be shortened and a distance between the inflow port 2 and the outflow port 3 can be shortened. In installation under a kitchen sink, connection becomes difficult when the distance between the inflow port 2 and the outflow port 3 of the flow channel switching system 1 is long. Owing to the U-turn path 31 disposed thus, the distance can be shortened so that the installation can be easier.

The straight pipe outward path 30 and the straight pipe return path 32 have a coaxial double-pipe structure, so that the flow channel switching system 1 can be divided at a unit division portion 33 on an upstream side of the branching portion 5 and a downstream side of the merging portion 6 in a state in which the straight pipe outward path 30 and the straight pipe return path 32 are integrated. That is, the flow channel switching system 1 can be divided into a first flow channel switching unit 34 having the inflow port 2 and the outflow port 3, and a second flow channel switching unit 35 having the branching portion 5 and the merging portion 6. Owing to the division into the first flow channel switching unit 34 and the second flow channel switching unit 35, the division portion can be connected inside the sink after the connection between the inflow port 2 of the first flow channel switching unit 34 and the water supply source 17, the connection between the outflow port 3 and the hot water/water mixing faucet 20, and the connection between the second flow channel switching unit 35 and the water purifier 16 outside the sink. Accordingly, the installation becomes easy.

Components of the first flow channel switching unit 34 and the second flow channel switching unit 35 are preferably manufactured by injection molding. When the components are manufactured by the injection molding, complex flow channels can be formed integrally, and can be therefore made compact. When, for example, polyphenylene sulfide with 40% glass fiber is used as the material for the injection molding, the components are high in mechanical strength and also high in chemical resistance. Accordingly, the components can be prevented from being damaged by a load of water pressure repeatedly applied thereto or can be prevented from being corroded and damaged by oil or a detergent in a kitchen. However, the material is not limited to the polyphenylene sulfide. A hard resin material such as an olefin-based resin such as modified polyphenylene ether or polyethylene, a silicone resin, a vinyl acetate resin, or a hard vinyl chloride resin can be used. The material for the injection molding is not particularly limited as long as it can maintain the function for a long time period.

A cylindrical inflow port connection member 36 is provided on the inflow port 2 of the first flow channel switching unit 34. One end of the inflow port connection member 36 is threaded as a pipe female thread, and an O-ring is attached to the other end of the inflow port connection member 36. Installation can be completed only if the other end to which the O-ring has been attached is inserted into the first flow channel switching unit 34 after the pipe female thread of the inflow port connection member 36 is fully screwed to the water supply source 17. Thus, the installation can be performed reliably in a short time.

When solenoid valves are used as the first on-off valve 10 and the second on-off valve 11 respectively, each of the flow channels can be open/closed quickly owing to high responsiveness of the solenoid valves, so that an unnecessary change in flow rate can be suppressed. In addition, when motorized valves, which are moved rotationally by electric power, are used as the first on-off valve 10 and the second on-off valve 11 respectively, each of apertures to be open/closed can be enlarged to increase the flow rate and reduce a pressure drop. When a three-way valve is used in place of the first on-off valve 10 and the second on-off valve 11, space can be saved. In addition, pneumatically operated valves that are open/closed by air pressure may be used as the first on-off valve 10 and the second on-off valve 11 respectively. In an initial state, the first on-off valve 10 is open and the second on-off valve 11 is closed.

A water shutoff valve 14 is disposed between the inflow port 2 of the first flow channel switching unit 34 and the unit division portion 33. Normally, the water shutoff valve 14 is always open for use, but can be shut off if abnormality such as water leakage occurs on the downstream side or if the user is away for a long time. The water shutoff valve 14 may be used as an alternative to an existing water shutoff valve. When the existing water shutoff valve is removed, a larger installation space can be secured so that installation can be easier. When a type that can be turned and closed by use of a slotted screwdriver is used as the structure of the water shutoff valve 14, the water shutoff valve 14 does not become an obstacle. However, a type that can be closed by a handle gripped and turned may be used.

A check valve 15 is disposed in the return path for purified water 8 to prevent water from flowing from the merging portion 6 into the return path for purified water 8. Owing to the check valve 15 and the aforementioned pressure regulating valve 12, large water pressure can be prevented from being applied to the water purifier for a long time. Consequently, damage to the water purifier can be prevented, and water leakage from the water purifier can be also prevented.

A sensor 13 measuring a state of water flowing in the raw water path 4 is disposed between the merging portion 6 and the outflow port 3. In the present embodiment, the flow sensor 13 measuring a flow rate of the water is disposed. The flow sensor 13 is constituted by a water wheel flow channel 37 that is shaped like a circle in section, a rotating shaft 38 that is disposed at the center of the water wheel flow channel, a water wheel 39 in which a magnet (not shown) is built, and a Hall IC (not shown) that detects a change in magnetic field and converts it into a voltage. An output of the voltage from the Hall IC is a pulse signal. The pulse signal with a frequency corresponding to the flow rate of the water flowing through the raw water channel 4 is sent from the flow sensor 13 to the control portion 9, which opens/closes the first on-off valve 10 and the second on-off valve 11 based on a result of arithmetically processing the pulse signal. The magnetic sensor that detects the magnetic field is not limited to the Hall IC, but can also be a reed switch. The flow sensor 13 may be disposed between the inflow port 2 and the branching portion 5. On this occasion, the configuration of the flow sensor 13 may be the same as the aforementioned one. A first flow sensor may be disposed between the branching portion 5 and the merging portion 6, and a second flow sensor may be disposed in the outward path for raw water 7 or the return path for purified water 8 so that the first flow sensor and the second flow sensor can send respective signals to the control portion 9 for arithmetic processing.

In addition, a pressure sensor that measures the pressure of the water flowing through the raw water path 4 may be used as the sensor 13. For example, in the present embodiment, water is made to flow or shut off by a hot water/water mixing on-off valve 23 located downstream of the outflow port 3. Accordingly, when the hot water/water mixing on-off valve 23 is open, water flows out from a discharge port 21 so that water pressure inside the raw water path 4 is lower. When the hot water/water mixing on-off valve 23 is closed, the water pressure inside the raw water path 4 is higher due to water pressure from the water supply source 17. Thus, when the water pressure inside the raw water path 4 is measured, it is also possible to determine whether water is flowing inside the raw water path 4 or not. In a case where the pressure sensor is used, the pressure sensor may be installed between the merging portion 6 and the outflow port 3 or between the inflow port 2 and the branching portion 5.

The sensor 13 is not limited to the aforementioned flow sensor or the aforementioned pressure sensor, but can be any sensor as long as the sensor can determine whether water is flowing inside the raw water path 4 or not. The sensor 13 may be a sensor using a float or a sensor detecting sound or vibration.

Figure 12:
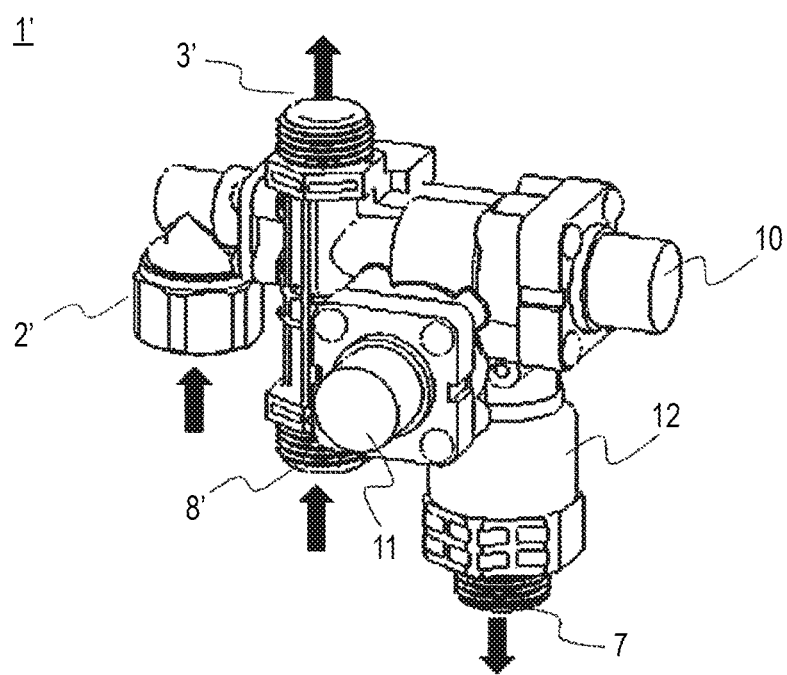
FIG. 12 is a perspective view of a flow channel switching system according to another embodiment of the present invention.

FIG. 12 shows a perspective view of a flow channel switching system 1' according to another embodiment of the present invention. The flow channel switching system 1' differs from the flow channel switching system 1 shown in FIGS. 2 and 3A and 3B in positions of an inflow port, an outflow port, and a return path for purified water, and a point that the entire flow channel switching system does not have a divided structure.

In the flow channel switching system 1', the inflow port 2' and the outflow port 3' are in such a positional relation that their respective central axes are not the same axes but two parallel axes. Owing to the positional relation in which the central axes of the inflow port 2' and the outflow port 3' are two parallel axes, a distance between the inflow port 2' and the outflow port 3' can be made shorter than that in a positional relation in which the central axes of the inflow port 2' and the outflow port 3' are the same axes. Existing piping under a sink is often short in length. When a distance between an inflow port and an outflow port is long, it is difficult to install a flow channel switching system in place of the existing piping. In the case of the flow channel switching system 1', the distance between the inflow port 2' and the outflow port 3' is so short that the flow channel switching system 1' can be easily installed. The phrase "distance between the inflow port 2' and the outflow port 3'" mentioned herein means a vertical distance in FIG. 12, and does not mean a shortest distance between the inflow port 2' and the outflow port 3' (diagonal distance in FIG. 12) or a length of a flow channel inside piping between the inflow port 2' and the outflow port 3'.

In the flow channel switching system 1', the outflow port 3' and a return path for purified water 8' are in such a positional relation that their respective central axes are the same axes. Owing to the outflow port 3' and the return path for purified water 8' arranged coaxially, pressure loss in the piping during discharge of purified water can be reduced so that a flow rate of the discharge of the purified water can be improved.

The flow channel switching system 1' cannot be divided into a first flow channel switching unit 34 and a second flow channel switching unit 35 as in the flow channel switching system 1 in FIGS. 2 and 3A and 3B and is integrated as a whole. The flow channel switching system 1' cannot have the aforementioned advantages because the flow channel switching system 1' cannot be divided into the first flow channel switching unit and the second flow channel switching unit. Instead, the number of members of the flow channel switching system 1' can be reduced so that manufacturing cost can be reduced.

Figure 4:
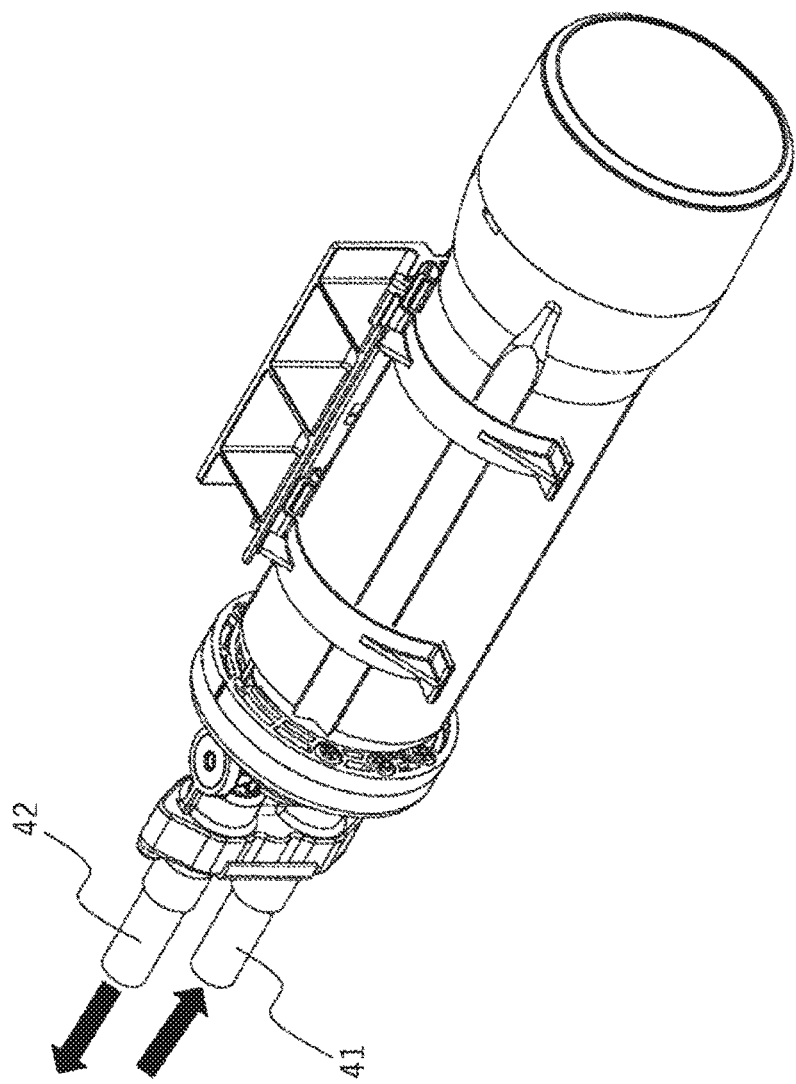
FIG. 4 is an example of the water purifier connected to the flow channel switching system according to the embodiment of the present invention.

FIG. 4 shows an example of the water purifier connected to the flow channel switching system according to the present invention. The water purifier 16 is provided with a raw water inlet 41 and a purified water outlet 42. The raw water inlet 41 is connected to the outward path for raw water 7 of the flow channel switching system 1, and the purified water outlet 42 is connected to the return path for purified water 8 of the flow channel switching system 1. The water purifier 16 is constituted by a water purifier body that is provided with the raw water inlet 41 and the purified water outlet 42, and a water purifier cartridge in which a filter medium is stored. A material formed by combining activated carbon, an ion exchanger, and a filtration membrane can be used as the filter medium stored in the water purifier cartridge. It is convenient to use a water purifier in which a water purifier body and a water purifier cartridge are connected by a bayonet mechanism so that the water purifier cartridge can be replaced in a single operation, as the water purifier cartridge can be replaced easily in a short time. It is convenient to use a small-sized water purifier that can be mounted on a wall under a sink, as the small-sized water purifier does not become an obstacle to storage under the sink.

Figure 5:
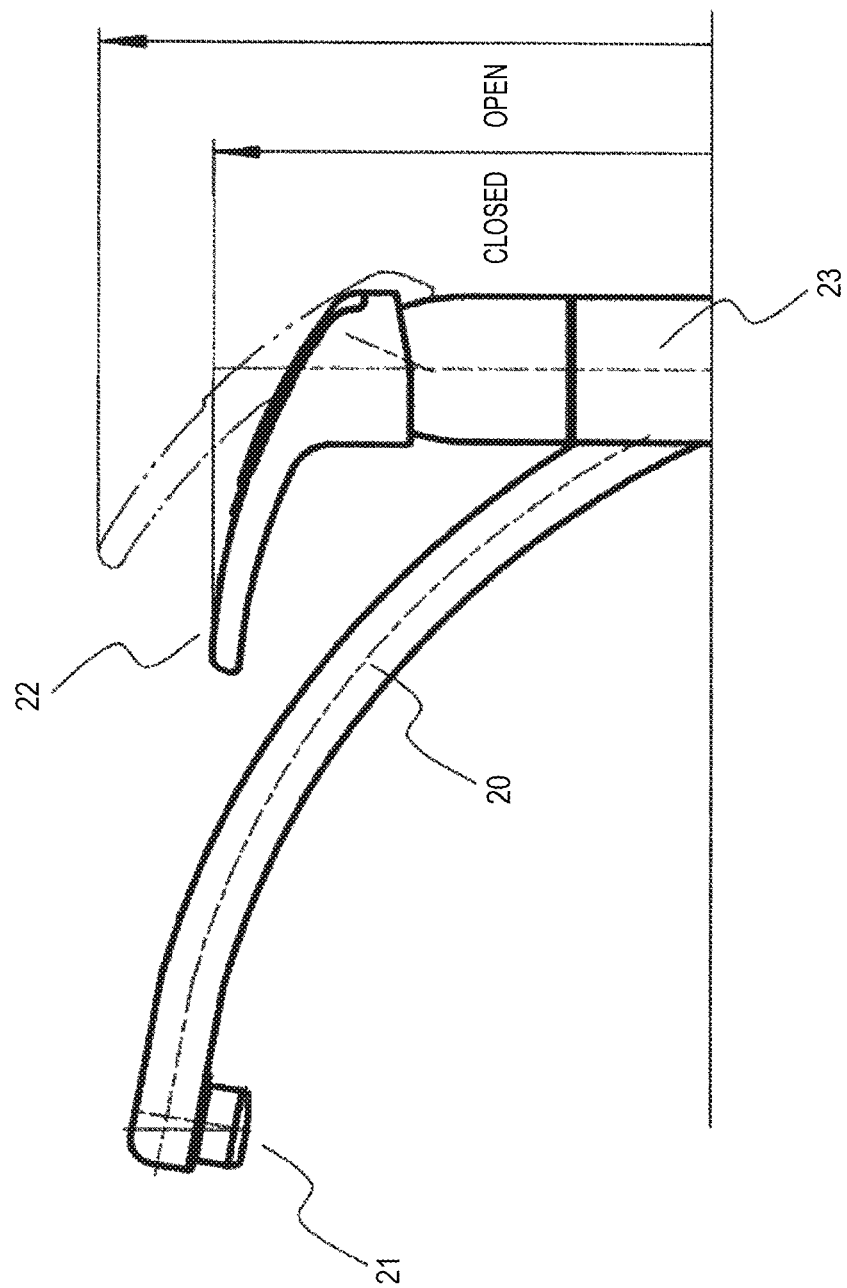
FIG. 5 is an example of the hot water/water mixing faucet connected to the flow channel switching system according to the embodiment of the present invention.
Figure 6:
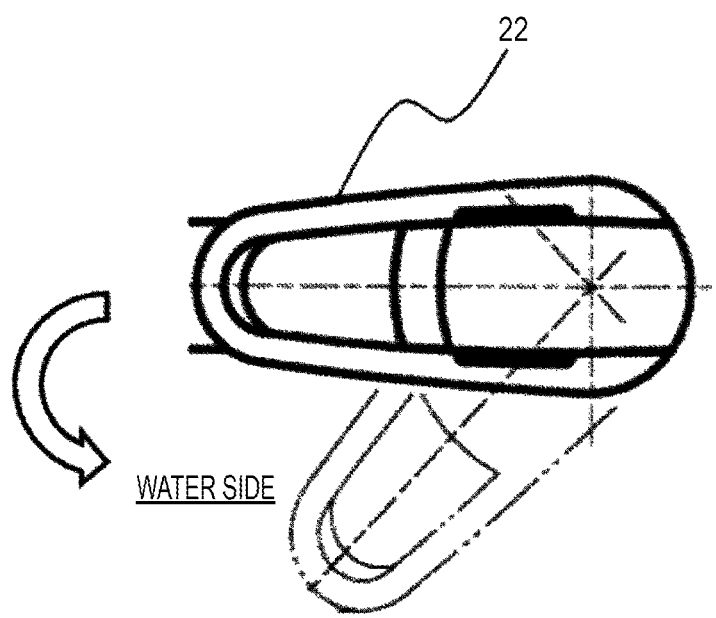
FIG. 6 is an example of an operating lever of the hot water/water mixing faucet connected to the flow channel switching system according to the embodiment of the present invention.

FIG. 5 and FIG. 6 show an example of the hot water/water mixing faucet connected to the flow channel switching system according to the embodiment of the present invention. The hot water/water mixing faucet 20 has the discharge port 21, an operating lever 22, and the hot water/water mixing on-off valve 23 that determines a hot water/water mixing ratio and an aperture based on an operation on the operating lever 22. As shown in FIG. 5, the aperture of the valve, i.e. a flow rate, is determined based on an angle of the operating lever 22 in a vertical direction. As shown in FIG. 6, the hot water/water mixing ratio of the valve, i.e. a water temperature, is determined based on an angle in a horizontal direction. The hot water/water mixing faucet 20 is connected to the water supply source 17 via the flow channel switching system 1, and is also connected to the hot water supply source 18. That is, the water supply source 17 is coupled to the inflow port 2 of the flow channel switching system 1, and the outflow port 3 of the flow channel switching system 1 is coupled to the hot water/water mixing on-off valve 23 of the hot water/water mixing faucet 20.

Next, a procedure for additionally installing the flow channel switching system 1 according to the embodiment of the present invention to an already installed hot water/water mixing faucet will be described. Piping that extends from the hot water/water mixing faucet 20 and is connected to the water supply source 17 is removed, and the inflow port connection member 36 is fully screwed to the water supply source 17. On this occasion, the existing water shutoff valve for the water supply source 17 may be removed. Next, the piping of the hot water/water mixing faucet 20 that was removed from the water supply source 17 is fully screwed and connected to the first flow channel switching unit 34. Further, of the inflow port connection member 36, the end portion to which the O-ring has been attached is inserted into the first flow channel switching unit 34, and retained by use of a quick fastener 40. When the piping of the hot water/ water mixing faucet 20 is screwed to be connected to the first flow channel switching unit 34, the piping can be screwed fully without paying attention to the installation angle. Accordingly, there is no need to worry about water leakage. Finally, the second flow channel switching unit 35 is attached to the first flow channel switching unit 34. Since several components as units are assembled in sequence, installation can be performed reliably in a short time. The pressure regulating valve 12 and an outward path connection member for raw water 52 placed on a front end of the pressure regulating valve 12 can be moved rotationally around the branching portion 5, so that the piping can be handled easily. When a return path connection member for purified water 53 can be also moved rotationally around the merging portion 6, the piping can be more easily handled. The connection method is not limited as long as it can maintain the function for a long time period without water leakage. A coupler connection type, a clip connection type, or the like can be used desirably as the connection method.

Next, an operation of discharging purified water by use of the flow channel switching system 1 according to the embodiment of the present invention and the hot water/water mixing faucet will be schematically described. When the operating lever 22 of the hot water/water mixing faucet 20 is turned to the right until it stops and then pushed up, the hot water/water mixing on-off valve 23 is open to discharge tap water from the discharge port 21. Since the first on-off valve 10 that is open and the second on-off valve 11 that is closed remain in their initial states, the tap water flows directly into the raw water path 4. When a signal corresponding to an amount of the water arrives at the control portion 9 from the sensor 13, determination is made based on the signal by the control portion 9 that the water is passing. Consecutively, a special operation of pushing the operating lever 22 down once and pushing it up within 3 seconds is performed. Then, a signal corresponding to a special change in flow rate caused by shutting off the water and passing the water again within the 3 seconds arrives at the control portion 9 from the sensor 13. Determination is made based on the signal by the control portion 9 that the shutoff of the water and the passing of the water within the 3 seconds have been performed. The control portion 9 performs an operation of opening the second on-off valve 11 and then closing the first on-off valve 10. As a result, the tap water passes through the branching portion 5 and the outward path for raw water 7 to enter the water purifier 16, and purified water that has been purified by the water purifier 16 passes through the return path for purified water 8 and the merging portion 6 to come out from the discharge port 21, although the tap water that passed through the raw water path 4 came out directly from the discharge port 21. When the operating lever 22 is finally pushed down, the hot water/water mixing on-off valve 23 is closed to shut off the purified water from the discharge port 21. Then, the signal arriving at the control portion 9 from the sensor 13 stops, or only a signal corresponding to a small amount of the water arrives at the control portion 9 from the sensor 13. Accordingly, the control portion 9 determines that the water has been shut off, and soon performs an operation of closing the second on-off valve 11 and opening the first on-off valve 10 so as to return the first on-off valve 10 and the second on-off valve 11 to their initial states.

Thus, the control portion 9 determines the opening/closing operation of the operating lever 22 based on the signal from the sensor 13, and controls the opening/closing of the first on-off valve 10 and the second on-off valve 11 according to the determination.

In addition, a system that has an on-off valve disposed between the hot water supply source 18 and the hot water/ water mixing on-off valve 23 and that closes the hot water side on-off valve during discharge of the purified water may be disposed to prevent warm water from mixing with the purified water.

Figure 7:
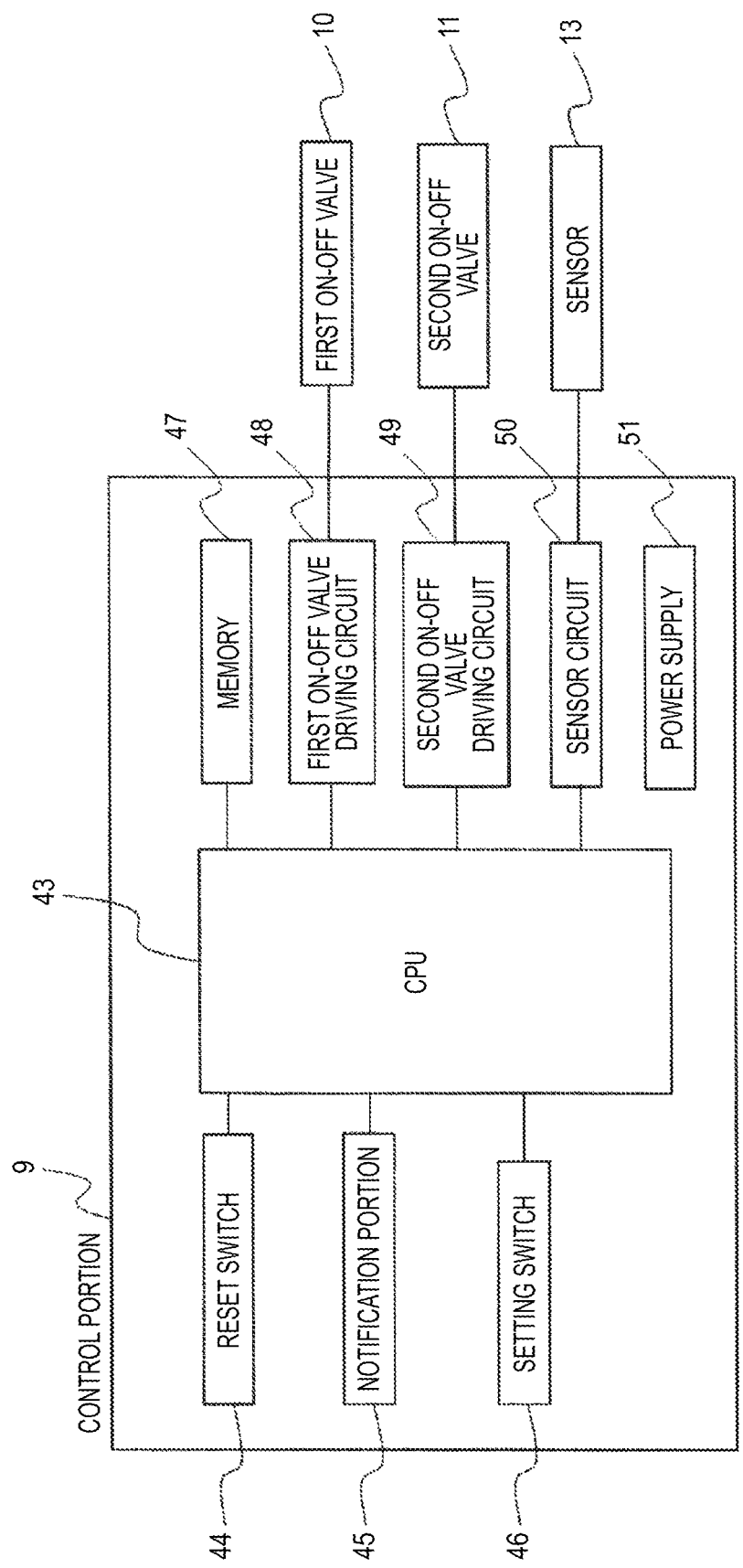
FIG. 7 is a block diagram of a control portion of the flow channel switching system according to the embodiment of the present invention.

Next, the control portion 9 of the flow channel switching system 1 according to the embodiment of the present invention will be described. FIG. 7 is a block diagram illustrating the control portion 9. The control portion 9 is provided with an arithmetic device constituted by a CPU 43 etc. A reset switch 44, a notification portion 45, a setting switch 46, a memory 47, a first on-off valve driving circuit 48, a second on-off valve driving circuit 49, a sensor circuit 50, and a power supply 51 are connected to the arithmetic device. An output signal of the sensor 13 is inputted to the CPU 43 through the sensor circuit 50, so that based on an arithmetically processed result, the first on-off valve 10 and the second on-off valve 11 are controlled to be open/closed through the first on-off valve driving circuit 48 and the second on-off valve driving circuit 49.

In the present embodiment, the flow sensor 13 that measures a flow rate of water is disposed as the sensor 13. The flow sensor 13 has the Hall IC (not shown) that detects a change in magnetic field and converts it into a voltage, and an output of the voltage from the Hall IC is a pulse signal. The frequency of the pulse signal is higher as the flow rate of the water increases.

The reset switch 44 is a switch for resetting an added-up time and an added-up flow rate. When the added-up time after resetting reaches a predetermined time or when the added-up flow rate reaches a predetermined flow rate, sound, light or vibration for urging the user to replace the water purifier 16 is sent from the notification portion 45. When the user replaces the water purifier 16 and operates the reset switch 44, the added-up time and the added-up flow rate are reset to newly start the added-up time, i.e., addition up of the time for which determination is made that the water is passing, and the added-up flow rate, i.e. addition up of the signal corresponding to the flow rate.

The setting switch 46 is a switch for setting the predetermined time and the predetermined flow rate in accordance with the model of the water purifier. When a DIP switch is used as the setting switch 46, it is small-sized to save space. However, the setting switch 46 is not limited to the DIP switch. A type that can input a numeral can support any kind of water purifier, and a button switch can provide an easy operation.

The power supply 51 consists of four AA size dry batteries connected in series (not shown). Alternatively, C size dry batteries or D size dry batteries may be used without any problem, or coin-shaped lithium batteries may be used. However, the AA size dry batteries are preferably used for their capacity and external dimensions. Any existing battery box can be used appropriately, but a battery box provided with a packing to prevent water or oil from entering from the outside is preferably used. The control portion 9, that is connected to the power supply 51 by lead wires, has a function of measuring the voltage.

A transmitter may be provided in the control portion 9 so that the control portion 9 can use Wi-Fi (registered trademark) or Bluetooth (registered trademark) to notify the user's smartphone of an arithmetically processed result. When the added-up time or the added-up flow rate for use of the water purifier can be transmitted to the smartphone and the added-up time or the added-up flow rate can be displayed on the smartphone, it is convenient for the user to make preparation to replace the water purifier with a new one. When the added-up flow rate for use of the raw water can be transmitted to the smartphone and the added-up flow rate including an estimated result of a water bill can be displayed on the smartphone, it is convenient for the user to make preparation for payment. When the battery voltage can be transmitted to the smartphone and the battery voltage together with the battery capacity can be displayed on the smartphone, it is convenient for the user to make preparation to replace the batteries with new ones. When the usage status is visualized thus through a predetermined cloud service, a more comfortable environment for using the water purifier can be provided.

Figure 8:
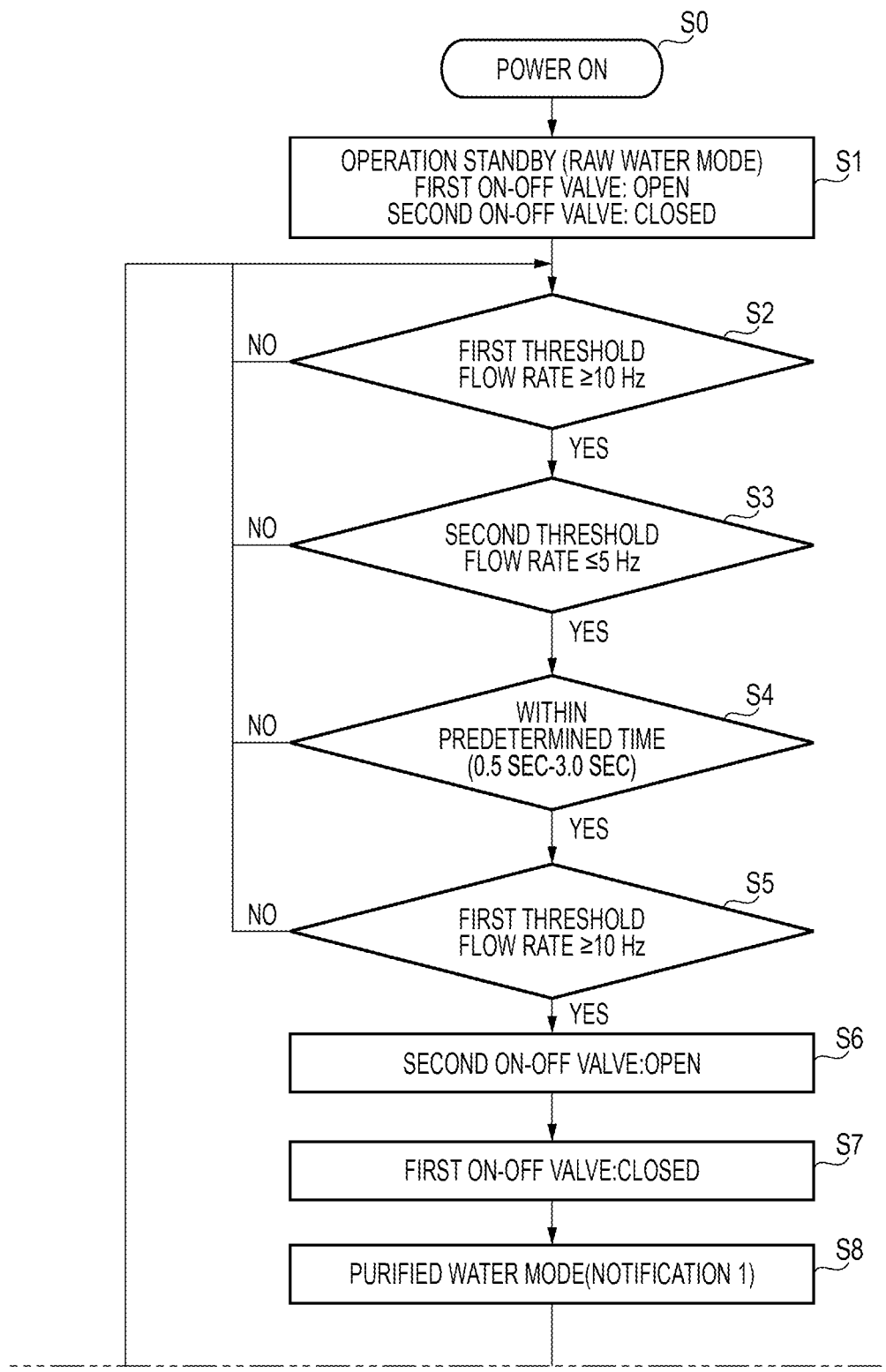
FIG. 8 is a flow chart of the flow channel switching system according to the embodiment of the present invention.

FIG. 8 shows control of the control portion 9 for switching from a raw water mode to a purified water mode. When the flow channel switching system 1 is powered on in a step S0, the flow channel switching system 1 turns to an operation standby state in a step S1. In the operation standby state, the first on-off valve 10 and the second on-off valve 11 are controlled by the control portion 9 to be open and closed respectively. That is, in the operation standby state, raw water can be discharged from the hot water/water mixing faucet 20. This state is called the raw water mode. On the other hand, a state in which purified water can be discharged from the discharge port 21 is called the purified water mode.

In steps S2 to S5, the purified water mode is detected. When a frequency of a pulse signal sent from the sensor 13 in the raw water mode is equal to or higher than a first threshold (the step S2), determination is made that the operating lever 22 of the hot water/water mixing faucet 20 is open and tap water is therefore being discharged from the discharge port 21. Successively, when the frequency of the pulse signal sent from the sensor 13 becomes equal to or lower than a second threshold (the step S3), and the frequency of the pulse signal sent from the sensor 13 becomes equal to or higher than the first threshold again (the step S5) within a predetermined time period (the step S4), determination is made that an operation of closing the operating lever 22 of the hot water/water mixing faucet 20 and then opening the operating lever 22 again within the predetermined time period has been performed. The operation in which the frequency of the pulse signal sent from the sensor 13 becomes equal to or higher than the first threshold again within the predetermined time period after the frequency of the pulse signal has become equal to or higher than the first threshold, and then has become equal to or lower than the second threshold is called switching operation to the purified water mode.

The first threshold is preferably set at a frequency corresponding to a flow rate in a range of equal to or higher than 1 L/min and equal to or lower than 2 L/min, and the second threshold is preferably set at a frequency corresponding to a flow rate in a range of equal to or higher than 0.5 L/min and lower than 1 L/min. In the present embodiment, the first threshold is set at a frequency 10 Hz, which corresponds to the flow rate in the range of equal to or higher than 1 L/min and equal to or lower than 2 L/min, and the second threshold is set at a frequency 5 Hz, which corresponds to the flow rate in the range of equal to or higher than 0.5 L/min and lower than 1 L/min. Moreover, the predetermined time is preferably set in a range of 0.5 seconds to 3.0 seconds.

Upon detection of the switching operation to the purified water mode, the control portion 9 opens the second on-off valve 11 (step S6) and then closes the first on-off valve 10 (step S7). In a case where the frequency of the pulse signal does not become equal to or lower than the second threshold (NO) in the step 3, a case where the state that the frequency of the pulse signal is equal to or lower than the second threshold continues within the predetermined time period (NO) in the step 4, or a case where the frequency of the pulse signal does not become equal to or higher than the first threshold (NO) in the step 5, the raw water mode would be maintained.

When the closing of the first on-off valve 10 in the step S7 is performed prior to the opening of the second on-off valve 11 in the step S6 or the closing of the first on-off valve 10 in the step S7 and the closing of the second on-off valve 11 in the step S6 are performed simultaneously, the flow rate momentarily decreases to fall below the first threshold so that there is a possibility that misdetection is made that the operating lever 22 of the hot water/water mixing faucet 20 has been closed to shut off the water. However, since the opening of the second on-off valve 11 in the step S6 is performed first, and the closing of the second on-off valve 10 in the step S7 is then performed, as described above, the mode can be switched from the raw water mode to the purified water mode without any misdetection.

When the flow channel switching system 1 has switched from the raw water mode to the purified water mode, the control portion 9 makes the notification portion 45 send intermittent sounds at long intervals like "beep, beep, beep" (notification 1) in a step S8. In this manner, the user can recognize that the water purifying system 1 has switched from the raw water mode to the purified water mode. Then, the control portion 9 starts an added-up time, i.e. addition up of a time for which determination is made that the water is passing, and an added-up flow rate, i.e. addition up of a signal corresponding to a flow rate (step S9).

The control portion 9 confirms a state in which the frequency of the pulse signal is kept equal to or higher than the first threshold (step 10). The time added up since the switching to the purified water mode becomes equal to or longer than a waste water threshold (step 11). At that point of time, the control unit 9 makes the notification portion 45 send intermittent sounds at short intervals like "beep-beep-beep-beep-beep-beep" (notification 2) in a step S12. In this manner, the user can recognize that retained water in the water purifier has been drained, i.e. waste water has been thrown away and purified water which is being discharged from the hot water/water mixing faucet 20 is drinkable.

Here, the notification 2 may be sent from the notification portion 45 at a point of time when not the time added up since the switching to the purified water mode but the flow rate added up since the switching to the purified water mode, i.e. addition up of the signal corresponding to the flow rate becomes equal to or larger than the waste water threshold. Even if the aperture of the operating lever 22 of the hot water/water mixing faucet 20 varies, the retained water to be drained can be economically suppressed to the minimum necessary.

The notification 1 does not have to be the intermittent sounds, but may be a melody with a musical scale, a continuous sound like beep, vibration, or light. The notification 2 also does not have to be the intermittent sounds, but may be a melody different from the notification 1, a continuous sound different in musical pitch from the notification 1, vibration different in frequency or amplitude from the notification 1, or light different in color from the notification 1. For each of the notifications 1 and 2, a conventional notification means can be selected appropriately, and sound, light, or vibration may be used in duplicate. When the notification means is allowed to be selected, the notification means can be fit for the user's preference.

If the user can know that the notification has been switched from the notification 1 to the notification 2, the user can accurately recognize that the water has changed from the waste water to the drinkable purified water. It is therefore possible to prevent the user from drinking the waste water or from throwing away the drinkable purified water.

When the frequency of the pulse signal sent from the sensor 13 becomes equal to or lower than the second threshold in the purified water mode (step 14), determination is made that the operating lever 22 of the hot water/water mixing faucet 20 has been closed and the purified water from the discharge port 21 has been therefore shut off. The control portion 9 closes the second on-off valve 11 (step S15), and then opens the first on-off valve 10 (step S16). That is, the flow channel switching system 1 switches from the purified water mode to the raw water mode.

Even in a case where the frequency of the pulse signal is not kept equal to or higher than the first threshold (NO) in the step 10 or the step 11, the control portion 9 closes the second on-off valve 11 (the step S15) and then opens the first on-off valve 10 (the step S16). That is, the flow channel switching system 1 switches from the purified water mode to the raw water mode.

Although not described in FIG. 8, the flow channel switching system 1 may automatically switch to the raw water mode when the time added up since the switching to the purified water mode exceeds the predetermined time. On this occasion, the control portion 9 closes the second on-off valve 11 and then opens the first on-off valve 10, and at the same time, stops the notification portion 45 from sending the notification 2. In this manner, the user can recognize that the flow channel switching system 1 has switched to the raw water mode. With this function added thus, the purified water can be prevented from being left flowing wastefully or the life of the water purifier can be prevented from being shortened inadvertently.

When the added-up flow rate, that is, addition up of the signal corresponding to the flow rate since the resetting made by an operation on the reset switch 44 exceeds a water purifier replacement threshold, the control portion 9 makes the notification portion 45 send sound, light, or vibration (notification 3) different from the notification 1 and the notification 2. In this manner, the user can recognize that the water purifier has reached the end of its life and needs to be replaced. The sound, light or vibration may be sent from the notification portion 45 when more than one year has passed since the resetting made by the operation on the reset switch 44. The water purifier can be prevented from becoming unhygienic due to extremely low use frequency and longer-term use than expected.

When the control portion 9 detects that the voltage of the power supply 51 has fallen below a battery life threshold, the control portion 9 makes the notification portion 45 send sound, light or vibration (notification 4) different from the notification 1, the notification 2, and the notification 3. In this manner, the user can recognize that the batteries have reached the ends of their lives and need to be replaced.

Next, motion of the flow channel switching system 1 according to the present invention will be described with reference to FIG. 9, FIG. 10 and FIG. 11.

Figure 9:
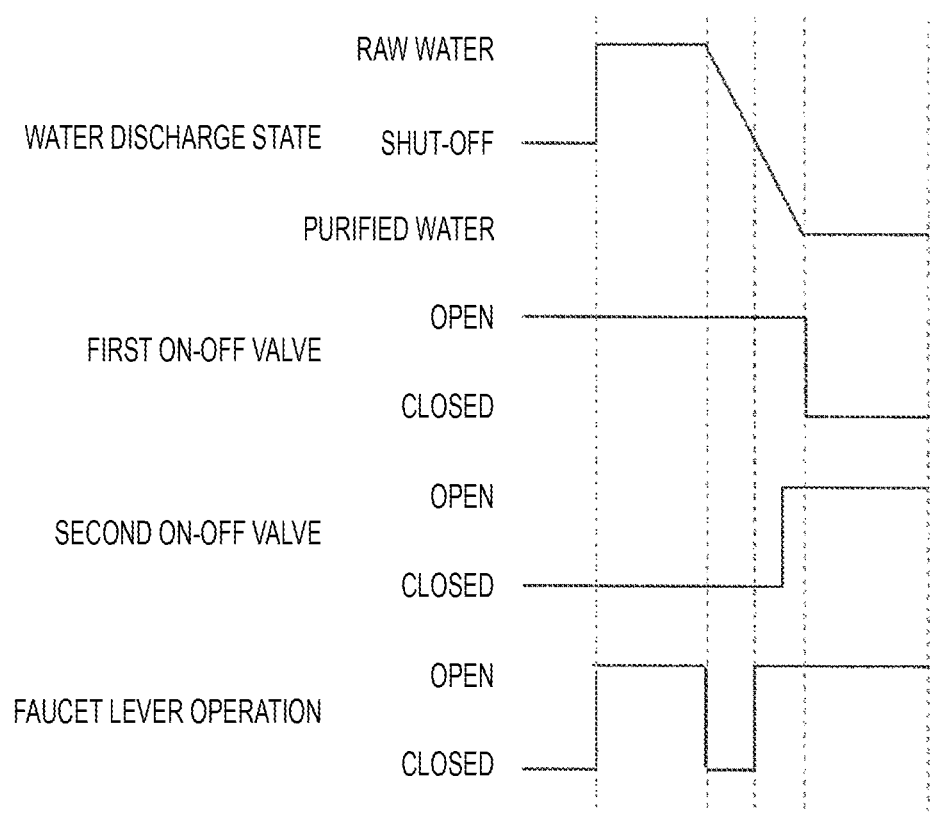
FIG. 9 is a time chart of motion of the flow channel switching system according to the embodiment of the present invention up to discharge of purified water.

FIG. 9 is a time chart from a water shutoff state of the flow channel switching system 1 according to the present embodiment to discharge of purified water. In a state that the operating lever 22 of the hot water/water mixing faucet 20 is closed (the water shutoff state), the first on-off valve 10 is open and the second on-off valve 11 is closed. When the operating lever 22 of the hot water/water mixing faucet 20 is turned to the right until it stops and then pushed up, the hot water/water mixing on-off valve 23 is open to discharge tap water from the discharge port 21. Since the first on-off valve 10 that is open and the second on-off valve 11 that is closed remain in their initial states, the tap water flows directly into the raw water path 4. When a signal corresponding to an amount of the water arrives at the control portion 9 from the sensor 13, determination is made based on the signal by the control portion 9 that the water is passing. Consecutively, a special operation of pushing the operating lever 22 down once and pushing it up within 3 seconds is performed. Then, a signal corresponding to a special change in flow rate caused by shutting off the water and passing the water again within 3 seconds arrives at the control portion 9 from the sensor 13. Determination is made based on the signal by the control portion 9 that the shutoff of the water and the passing of the water again within the 3 seconds have been performed. The control portion 9 performs an operation of opening the second on-off valve 11 and then closing the first on-off valve 10. As a result, the tap water passes through the branching portion 5 and the outward path for raw water 7 to enter the water purifier 16, and purified water that has been purified by the water purifier 16 passes through the return path for purified water 8 and the merging portion 6 to come out from the discharge port 21, although the tap water that passed through the raw water path 4 came out directly from the discharge port 21.

Figure 10:
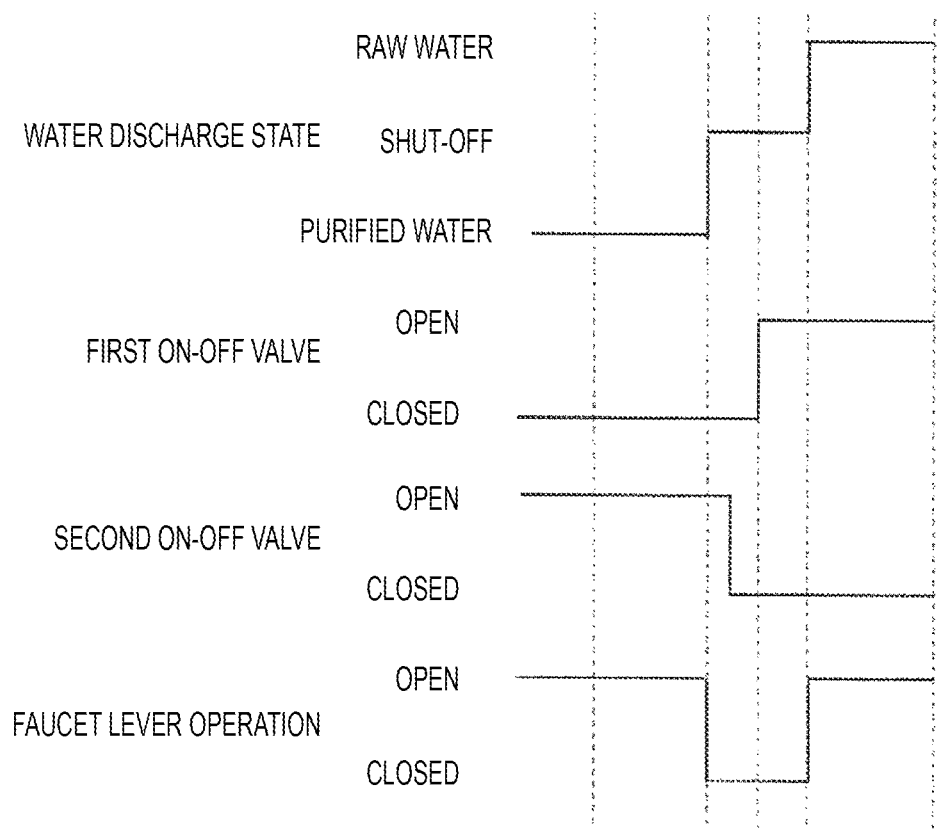
FIG. 10 is a time chart of motion of the flow channel switching system according to the embodiment of the present invention to switch from a purified water mode to a raw water mode.

FIG. 10 is a time chart of motion of the flow channel switching system 1 according to the present embodiment to switch from the purified water mode to the raw water mode. As shown in FIG. 10, when the operating lever 22 is pushed down in a purified water discharge state, the hot water/water mixing on-off valve 23 is closed to shut off the purified water from the discharge port 21. Then, a signal arriving at the control portion 9 from the sensor 13 stops, or only a signal corresponding to a small amount of the water arrives at the control portion 9 from the sensor 13. Accordingly, the control portion 9 determines that the water has been shut off, and soon performs an operation of closing the second on-off valve 11 and then opening the first on-off valve 10 so as to return the second on-off valve 11 and the first on-off valve 10 to their initial states.

Figure 11:
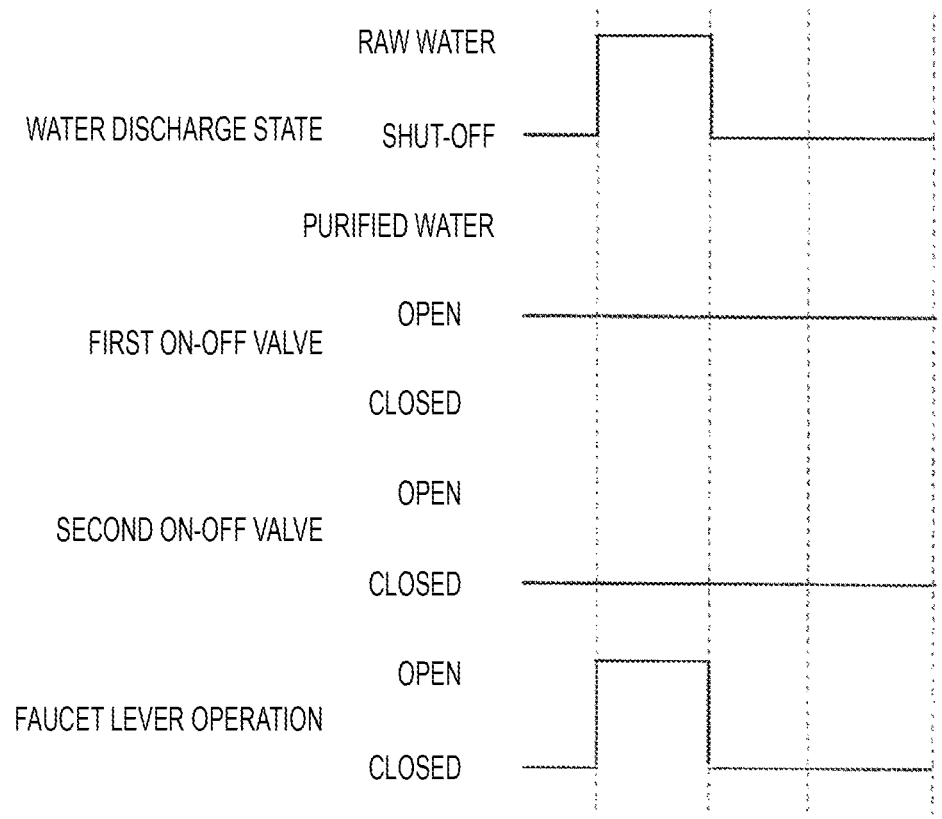
FIG. 11 is a time chart of motion of the flow channel switching system according to the embodiment of the present invention during use of raw water.

FIG. 11 is a time chart of motion of the flow channel switching system according to the present embodiment during use of the raw water. As shown in FIG. 11, when the operating lever 22 is pushed up, the hot water/water mixing on-off valve 23 is open to discharge the tap water from the discharge port 21. Since the first on-off valve 10 that is open and the second on-off valve 11 that is closed remain in their initial states, the tap water directly flows into the raw water path 4. When a signal corresponding to an amount of the water arrives at the control portion 9 from the sensor 13, determination is made based on the signal by the control portion 9 that the water is passing. When the operating lever 22 is consecutively pushed down, the hot water/water mixing on-off valve 23 is closed to shut off the discharge of the tap water from the discharge port 21. Since the signal sent from the sensor 13 also stops, determination is made by the control portion 9 that the water has been shut off. Since the special operation of pushing the operating lever 22 down once and pushing it up within 3 seconds is not performed, determination is made by the control portion 9 that passing of the water again within 3 seconds is not performed after the shutoff of the water. Consequently, the first on-off valve 10 remains open and the second on-off valve 11 remains closed.

As described above, when the flow channel switching system 1 according to the embodiment of the present invention is used, switching between the raw water mode and the purified water mode can be made by simple operation on the operating lever of the hot water/water mixing faucet. There is no need for purchase of an expensive special hot water/water mixing composite faucet for water purifier as in PTL 1 but an under-sink water purifier can be installed with the existing faucet. There is also no need for construction work for installing a touch panel for operation, for installing a push button, or for routing wiring as in PTL 2. There is also no need for construction work for drilling a hole in the existing sink so that the under-sink water purifier can be easily installed.

Although the embodiments of the present invention have been described above, they are just for illustration purposes and not to be construed narrowly, and may be carried out in modes having various changes, modifications, and improvements made based on knowledge of those skilled in the art. As long as the modes for carrying out the present invention conforms to the gist of the present invention and include the features of the present invention, they are included in the scope of the present invention.

EXAMPLES

Example 1

The flow channel switching system according to the present invention, a single-lever type shower-including mixing faucet for sink KM5021TEC (hot water/water mixing faucet) made by KVK Corporation, an under-sink type water purifier SK88 made by Toray Industries, Inc., a water supply source, and a hot water supply source were connected.

When a user turned the single lever to the right until it stopped and then pushed it up, tap water was discharged vigorously from a discharge port of the shower. When the user performed an operation of pushing the single lever down once and then pushing it up after 1.5 seconds, the user heard intermittent sounds at long intervals like "beep, beep, beep". Therefore, the user recognized that the flow channel switching system had switched from the raw water mode to the purified water mode. During the switching, the flow rate slightly decreased to 3.5 L/min, but the water was not shut off. After 15 seconds, the intermittent sounds at long intervals like "beep, beep, beep" turned to intermittent sounds at short intervals like "beep-beep-beep-beep-beep-beep". Therefore, the user recognized that retained water in the water purifier had been drained, i.e., waste water had been thrown away, and purified water became drinkable. When the user pushed the single lever down, the purified water from the discharge port of the shower was shut off, and at the same time, the intermittent sounds at short intervals like "beep-beep-beep-beep-beep-beep" also stopped.

Example 2

The flow channel switching system according to the present invention, a vertical free faucet K16NDSSE (single faucet without hot water/water mixing function) made by KVK Corporation, an under-sink type water purifier SK88 manufactured by Toray Industries, Inc., a water supply source, and a hot water supply source were connected.

When a user turned a rotating lever at the base of the faucet to the right, tap water was vigorously discharged from a discharge port. When the user performed an operation of turning the rotating lever to the left once until it stopped, and then turning it to the right after 1.5 seconds, the user heard intermittent sounds at long intervals like "beep, beep, beep". Therefore, the user recognized that the flow channel switching system had switched from the raw water mode to the purified water mode. During the switching, the flow rate slightly decreased to 3.5 L/min, but the water was not shut off. After 15 seconds, the intermittent sounds at long intervals like "beep, beep, beep" turned to intermittent sounds at short intervals like "beep-beep-beep-beep-beep-beep". Therefore, the user recognized that retained water in the water purifier had been drained, i.e., waste water had been thrown away, and purified water became drinkable. When the user turned the rotating lever to the left until it stopped and brought it down, purified water from the discharge port was shut off, and at the same time, the intermittent sounds at short intervals like "beep-beep-beep-beep-beep-beep" also stopped.

Although the various embodiments have been described above with reference to the drawings, it is a matter of course that the present invention is not limited to such examples. It is obvious that any person skilled in the art can conceive of various examples of changes or modifications within the scope of Claims, which are also naturally understood to belong to the technical scope of the present invention. In addition, the respective constituent elements in the aforementioned embodiments may be combined desirably without departing from the gist of the invention.

The present application is based on a Japanese patent application (Patent Application No. 2019-203685) filed on Nov. 11, 2019, the contents of which are incorporated by reference in the present application.

REFERENCE SIGNS LIST 1, 1' flow channel switching system
2, 2' inflow port
3, 3' outflow port
4 raw water path
5 branching portion
6 merging portion
7 outward path for raw water
8, 8' return path for purified water
9 control portion
10 first on-off valve
11 second on-off valve
12 pressure regulating valve
13 sensor (flow sensor)
14 water shutoff valve
15 check valve
16 water purifier
17 water supply source
18 hot water supply source
20 hot water/water mixing faucet
21 discharge port
22 operating lever
23 hot water/water mixing on-off valve
30 straight pipe outward path
31 U-turn path
32 straight pipe return path
33 unit division portion
34 first flow channel switching unit
35 second flow channel switching unit
36 inflow port connection member
37 water wheel flow channel
38 rotating shaft
39 water wheel
40 quick fastener
41 raw water inlet
42 purified water outlet
43 CPU
44 reset switch
45 notification portion
46 setting switch
47 memory
48 first on-off valve driving circuit
49 second on-off valve driving circuit
50 sensor circuit
51 power supply
52 outward path connection member for raw water
53 return path connection member for purified water

The invention claimed is:

1. A flow channel switching system used in a water purifying system, the flow channel switching system comprising:
a raw water path that has an inflow port and an outflow port;
an outward path for raw water and a return path for purified water that are connected to a water purifier;
a branching portion that is disposed in the raw water path to split, into the outward path for raw water, a raw water that has flown through the raw water path from the inflow port;
a merging portion that is disposed between the branching portion and the outflow port in the raw water path to merge, into the raw water path, a purified water that has been purified by the water purifier and has flown through the return path for purified water;
a first on-off valve that is disposed between the branching portion and the merging portion in the raw water path;
a second on-off valve that is disposed in the outward path for raw water;
a sensor that is disposed between the inflow port and the branching portion or between the merging portion and the outflow port in the raw water path, and that measures a state of water flowing through the raw water path; and
a control portion that controls the first on-off valve and the second on-off valve based on a signal from the sensor,
wherein the control portion is configured to perform control of opening the second on-off valve and closing the first on-off valve when receiving, from the sensor, a signal indicating a state that water is flowing in the raw water path, then receiving a signal indicating a state that water is not flowing in the raw water path, and then receiving a signal indicating a state that water is flowing in the raw water path again within a predetermined time period.

2. The flow channel switching system according to claim 1,
wherein the sensor is a flow sensor that sends out a pulse signal with a frequency corresponding to a flow rate of water flowing through the raw water path, the signal indicating the state that water is flowing in the raw water path is a pulse signal with a frequency equal to or higher than a first threshold, and the signal indicating the state that water is not flowing in the raw water path is a pulse signal with a frequency equal to or lower than a second threshold.

3. The flow channel switching system according to claim 2,
wherein the first threshold is set at a frequency corresponding to a flow rate in a range of equal to or higher than 1 L/min and equal to or lower than 2 L/min, and the second threshold is set at a frequency corresponding to a flow rate in a range of equal to or higher than 0.5 L/min and lower than 1 L/min.

4. The flow channel switching system according to claim 2, further comprising a notification portion that emits sound, light, and/or vibration, wherein the control portion adds up a usage amount based on a pulse signal from the flow sensor during an open state of the second on-off valve, and sends out, to the notification portion, a signal for urging replacement of the water purifier when the added-up amount is equal to or larger than a water purifier replacement threshold, and wherein upon reception of the signal for urging replacement of the water purifier from the control portion, the notification portion emits the sound, light, and/or vibration for urging replacement of the water purifier.

5. The flow channel switching system according to claim 2, further comprising a notification portion that emits sound, light, and/or vibration, wherein the control portion adds up a usage amount based on a pulse signal from the flow sensor from when the first on-off valve is closed to when the second on-off valve is open next time, and sends out, to the notification portion, a signal for urging usage of the water purifier when the added-up amount is equal to or larger than a waste water threshold, and wherein upon reception of the signal for urging usage of the water purifier from the control portion, the notification portion emits the sound, light, and/or vibration for urging usage of the water purifier.

6. The flow channel switching system according to claim 2, further comprising a notification portion that emits sound, light, and/or vibration, wherein the control portion includes a battery, and sends out, to the notification portion, a signal for urging replacement of the battery when a voltage of the battery is equal to or higher than a battery life threshold, and wherein upon reception of the signal for urging replacement of the battery from the control portion, the notification portion emits the sound, light, and/or vibration for urging replacement of the battery.

7. A water purifying system comprising:

the flow channel switching system according to claim 1; and the water purifier having a raw water inlet and a purified water outlet, wherein the outward path for raw water and the return path for purified water in the flow channel switching system are respectively connected to the raw water inlet and the purified water outlet in the water purifier.

* * * * *